(12) United States Patent
Lee et al.

(10) Patent No.: US 11,858,119 B2
(45) Date of Patent: Jan. 2, 2024

(54) MOVING DEVICE AND APPARATUS FOR SUPPLYING CHEMICAL LIQUID HAVING A MOVING DEVICE

(71) Applicant: Semes Co., Ltd., Cheonan-si (KR)

(72) Inventors: Eonseok Lee, Cheonan-si (KR); Boramchan Sung, Asan-si (KR)

(73) Assignee: Semes Co., Ltd., Cheonan-si (KR)

( * ) Notice: Subject to any disclaimer, the term of this patent is extended or adjusted under 35 U.S.C. 154(b) by 2 days.

(21) Appl. No.: 17/515,750

(22) Filed: Nov. 1, 2021

(65) Prior Publication Data
US 2022/0152838 A1    May 19, 2022

(30) Foreign Application Priority Data
Nov. 17, 2020  (KR) .................. 10-2020-0154084

(51) Int. Cl.
*B25J 11/00* (2006.01)
*B25J 9/10* (2006.01)
*B05C 11/00* (2006.01)
*B25J 19/00* (2006.01)
*B05C 5/02* (2006.01)

(52) U.S. Cl.
CPC ............. *B25J 11/0075* (2013.01); *B05C 5/02* (2013.01); *B05C 11/00* (2013.01); *B25J 9/108* (2013.01); *B25J 9/1015* (2013.01); *B25J 19/0091* (2013.01)

(58) Field of Classification Search
USPC .... 118/313, 315, 300, 663, 305, 323; 347/5, 347/19, 37, 2
See application file for complete search history.

(56) References Cited

U.S. PATENT DOCUMENTS

| | | | |
|---|---|---|---|
| 8,079,662 B2 * | 12/2011 | Nakajima | ........... H01L 21/6715 414/781 |
| 2017/0129265 A1 * | 5/2017 | Lowrance | .................. B41J 3/28 |
| 2020/0023658 A1 * | 1/2020 | Ko | ........................... B41J 19/00 |

FOREIGN PATENT DOCUMENTS

| | | |
|---|---|---|
| KR | 10-2003-0025489 A | 3/2003 |
| KR | 10-2008-0093409 A | 10/2008 |
| KR | 10-2010-0064899 A | 6/2010 |
| KR | 10-2012-0007197 | 1/2012 |
| KR | 10-1246611 B1 | 3/2013 |
| KR | 10-2017-0102054 A | 9/2017 |

* cited by examiner

*Primary Examiner* — Yewebdar T Tadesse
(74) *Attorney, Agent, or Firm* — DALY, CROWLEY, MOFFORD & DURKEE, LLP (57) ABSTRACT

An apparatus for supplying chemical liquid may include a gantry, a chemical liquid supply member providing a chemical liquid onto a substrate, and a moving device supporting the chemical liquid supply member and moving along the gantry. The moving device may include a moving member, load supporting members and absorbing members. The moving member may support one side of the chemical liquid supply member and may run over the gantry. The moving member may cover an upper face, a first side and a second side of the gantry. The load supporting members may support a load applied to the moving member and the gantry while maintaining a substantially constant distance between the moving member and the gantry. The absorbing members may absorb an impulsive load or an impulsive force applied to the moving member and/or the gantry when the moving member deviates from a moving path provided by the gantry.

13 Claims, 5 Drawing Sheets

MOVING DEVICE AND APPARATUS FOR SUPPLYING CHEMICAL LIQUID HAVING A MOVING DEVICE

CROSS-REFERENCE TO RELATED APPLICATION

This application claims priority to Korean Patent Application No. 10-2020-0154084 filed on Nov. 17, 2020 in the Korean Intellectual Property Office (KIPO), the contents of which are herein incorporated by reference in its entirety.

BACKGROUND

1. Field

Example embodiments of the invention relate to a moving device and an apparatus for supplying chemical liquid including a moving device. More particularly, example embodiments of the invention relate to a moving device having a moving member capable of running along a traveling way, and an apparatus for supplying chemical liquid including a moving device capable of supporting a chemical liquid supply member for providing chemical liquid onto a substrate.

2. Related Technology

In manufacturing of a display device such as an organic light emitting display device, a process of supplying a chemical liquid onto a substrate may be generally performed so as to form pixels on the substrate. Such process of supplying the chemical liquid onto the substrate may be executed using an apparatus for supplying chemical liquid including a moving member which can support an ink jet head for providing the chemical liquid onto the substrate and can move along a gantry for providing a predetermined moving path.

Recently, the size of the substrate for manufacturing the display device has been increased, and thus the dimensions of the apparatus for supplying chemical liquid have been increased. Particularly, the apparatus for supplying chemical liquid of relatively large dimensions may include a chemical liquid supply member provided as a single module including a plurality of ink jet heads so that the size and weight of the chemical liquid supply member may be increased. Hence, a moving member and a traveling way may receive considerably increased loads when the moving member runs on the traveling way while moving member supports the chemical liquid supply member.

If the increased loads are applied to the moving member and the traveling way, the stabilities of the traveling way and the moving member may be reduced and also the displacement of the chemical liquid supply member may be increased. As a result, damages to the moving member, the traveling way and/or the chemical liquid supply member may be generated and the chemical liquid may not be exactly supplied onto desired regions of the substrate from the chemical liquid supply member.

SUMMARY

One aspect of the invention provides a moving device which may enhance stability of a moving member running over a traveling way, and may prevent damages to the moving member and the traveling way.

Another aspect of the invention provides an apparatus for supplying chemical liquid including a moving device which may support a chemical liquid supply member, may enhance stability of a moving member running along a gantry, and may prevent damages to the moving member and the gantry.

Still another aspect of the invention provides an apparatus for supplying chemical liquid including a moving device which may support a chemical liquid supply member, may enhance stabilities of moving members running along a first gantry and a second gantry, and may prevent damages to the moving members and the first and second gantries.

According to an aspect of the invention, there is provided a moving device including a traveling way, a moving member, load supporting members and absorbing members. The moving member may run over the traveling way and may cover an upper face, a first side and a second side of the traveling way. The load supporting members may support a load applied to the moving member and the traveling way while maintaining a substantially constant distance between the moving member and the traveling way. The load supporting members may be disposed between the upper face of the traveling way and a bottom face of the moving member and between the first side of the traveling way and a first inner side of the moving member. The absorbing members may absorb an impulsive load or an impulsive force applied to the moving member and/or the traveling way when the moving member deviates from a moving path provided by the traveling way. The absorbing member may be disposed between the second side of the traveling way and a second inner side of the moving member In example embodiments, each of the absorbing members may include an air bearing and a damping member and each of the load supporting members may include an air bearing. In this case, the damping member may include a spring plate.

In example embodiments, the load supporting members may be disposed between the first side of the traveling way and the first inner side of the moving member, and between the upper face of the traveling way and the bottom face of the moving member, and the absorbing members may be disposed between the second side of the traveling way and the second inner side of the moving member.

In example embodiments, a first side of the moving member may entirely cover the first side of the traveling member and a second side of the moving member may partially cover the second side of the traveling member.

In example embodiments, the moving device may additionally include a driving member applying a driving force to the moving member such that the moving member moves over the traveling way; and a control member correcting the moving member by adjusting the driving force provided by the driving member if the moving member deviates from the moving path.

According to another aspect of the invention, there is provided an apparatus for supplying chemical liquid including a gantry, a chemical liquid supply member providing a chemical liquid onto a substrate, and a moving device supporting the chemical liquid supply member and moving along the gantry. The moving device may include a moving member, load supporting members and absorbing members. The moving member may support one side of the chemical liquid supply member, may run over the gantry, and may cover an upper face, a first side and a second side of the gantry. The load supporting members may support a load applied to the moving member and the gantry while maintaining a substantially constant distance between the moving member and the gantry. The absorbing members may absorb an impulsive load or an impulsive force applied to the moving member and/or the gantry when the moving member deviates from a moving path provided by the gantry.

In example embodiments, each of the absorbing members may include an air bearing and a damping member and each of the load supporting members may include an air bearing. Here, the damping member may include a spring plate.

In example embodiments, the load supporting members may be disposed between a first side of the gantry and a first inner side of the moving member and between an upper face of the gantry and the bottom face of the moving member, and the absorbing members may be disposed between a second side of the gantry and a second inner side of the moving member.

In example embodiments, a first side of the moving member may entirely cover the first side of the gantry and a second side of the moving member may partially covers the second side of the gantry.

In example embodiments, the apparatus for supplying chemical liquid may additionally include a driving member applying a driving force to the moving member such that the moving member moves over the gantry, and a control member correcting the moving member by adjusting the driving force provided by the driving member if the moving member deviates from the moving path.

According to still another aspect of the invention, there is provided an apparatus for supplying chemical liquid including a first gantry, a second gantry substantially facing the first gantry, a chemical liquid supply member providing a chemical liquid onto a substrate, a first moving member supporting one side of the chemical liquid supply member and running over the first gantry, a second moving member supporting another side of the chemical liquid supply member and running over the second gantry, load supporting members and absorbing members. The load supporting members may support loads applied to the first and the second moving members and the first and second gantries while maintaining substantially constant distances between the first moving member and the first gantry and between the second moving member and the second gantry. The absorbing members may absorb impulsive loads or impulsive forces applied to the first and second moving members and/or the first and second gantries when the first moving member and the second moving member deviate from a first moving path and a second moving path provided by the first gantry and the second gantry, respectively.

In example embodiments, each of the absorbing members may include an air bearing and a damping member, and each of the load supporting members comprises an air bearing. For example, the damping member may include a spring plate.

In some example embodiments, the load supporting members may be disposed between one side of the first gantry and one side of the first moving member, between an upper face of the first gantry and a bottom face of the first moving member, between one side of the second gantry and one side of the second moving member, and between an upper face of the second gantry and a bottom face of the second moving member. The absorbing members may be disposed between another side of the first gantry and another side of the first moving member and between another side of the second gantry and another side of the second moving member In other example embodiments, the load supporting members may be disposed between an upper face of the first gantry and a bottom face of the first moving member, between an upper face of the second gantry and a bottom face of the second moving member and between one side of the first gantry and one side of the first moving member. The absorbing members may be disposed between another side of the first gantry and another side of the first moving member, between one side of the second gantry and one side of the second moving member and between another side of the second gantry and another side of the second moving member In still other example embodiments, the load supporting members may be disposed between an upper face of the first gantry and a bottom face of the first moving member, between an upper face of the second gantry and a bottom face of the second moving member, between one side of the first gantry and one side of the first moving member, and between one side of the second gantry and one side of the second moving member. The absorbing members may be disposed between another side of the first gantry and another side of the first moving member and between another side of the second gantry and another side of the second moving member.

In some example embodiments, one side of the first moving member may entirely cover one side of the first gantry, and another side of the first moving member may partially cover another side of the first gantry. One side of the second moving member may entirely cover one side of the second gantry and another side of the second moving member may partially cover another side of the second gantry.

In some example embodiments, the apparatus for supplying chemical liquid may additionally include a first driving member applying a first driving force to the first moving member such that the first moving member moves over the first gantry, a second driving member applying a second driving force to the second moving member such that the second moving member moves over the second gantry and control members correcting the first moving member and/or the second moving member by adjusting the first driving force and/or the second driving force if the first moving member deviates from the first moving path and/or the second moving member deviates from the second moving path.

According to example embodiments of the invention, the absorbing members may effectively absorb the impulsive load or the impulsive force applied to the moving member and/or the traveling way (the gantry) so that the damages to the moving member and the traveling way (the gantry) may be prevented. The apparatus for supplying chemical liquid including such moving device may easily move a substrate having relatively large dimensions and may exactly provide the chemical liquid onto the desired regions of the substrate from the chemical liquid supply member.

BRIEF DESCRIPTION OF THE DRAWINGS

Example embodiments will be more clearly understood from the following detailed description taken in conjunction with the accompanying drawing. The following figures represent non-limiting, example embodiments as described herein.

DESCRIPTION OF EMBODIMENTS

Various embodiments will be described more fully hereinafter with reference to the accompanying drawings, in which some embodiments are shown. The invention may, however, be embodied in many different forms and should not be construed as limited to the embodiments set forth herein. Rather, these embodiments are provided so that this description will be thorough and complete, and will fully convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (for example, rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include a plurality of forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-sectional illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the face through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the invention will be described in detail with reference to the accompanying drawings. Like elements or components can be indicated by like reference numerals throughout the drawings, and the repeated explanations of like elements or components may be omitted.

Figure 1:
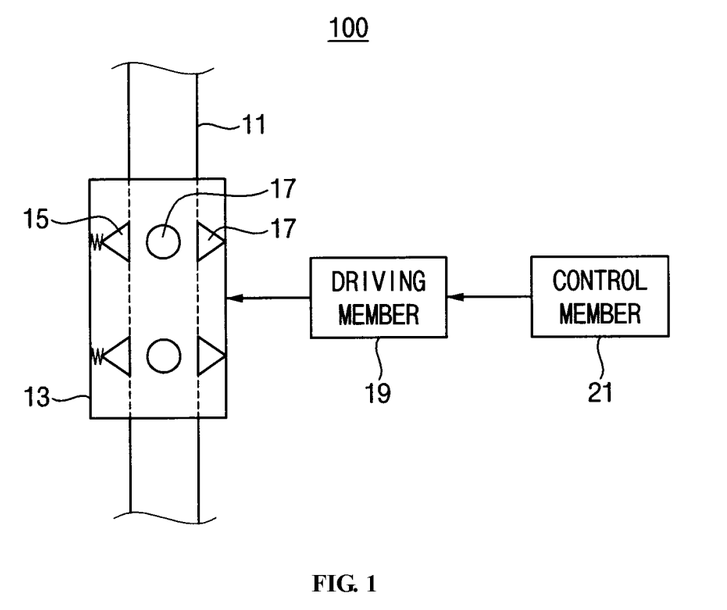
FIG. 1 is a schematic plan view illustrating a moving device in accordance with example embodiments of the invention.
Figure 2:
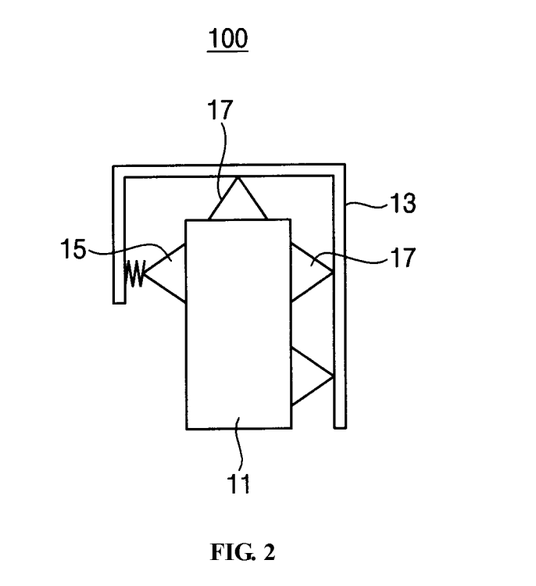
FIG. 2 is a schematic cross sectional view illustrating a moving device in accordance with example embodiments of the invention.

FIG. 1 is a schematic plan view illustrating a moving device in accordance with example embodiments of the invention. FIG. 2 is a schematic cross sectional view illustrating a moving device in accordance with example embodiments of the invention.

Referring to FIGS. 1 and 2, a moving device 100 according to example embodiments may include a traveling way 11, a moving member 13, at least one absorbing member 15, at least one load supporting member 17, a driving member 19 and a control member 21.

The traveling way 11 may provide a predetermined moving path along which the moving member 19 can run. The traveling way 11 may include, for example, a gantry for an apparatus for supplying chemical liquid, a traveling rail for an overhead hoist transport (OHT), etc.

The moving member 13 may run over the traveling way 11. Particularly, the moving member 13 may move in a longitudinal direction of the traveling way 11 where the traveling way 11 may extend. For example, the traveling way 11 may have a shape of a substantial straight line.

Alternatively, the traveling way 11 may include straight portions and curved portions as desired. The moving member 13 may have a structure which may substantially enclose an upper face and sides of the traveling way 11 such that the moving member 13 may more stably run over the traveling way 11.

As illustrated in FIG. 2, the moving member 13 may substantially enclose the upper face of the traveling way 11, a first side of the traveling way 11 and a second side of the traveling way 11 substantially opposed to the first side thereof. In this case, the moving member 13 may entirely cover the upper face of the traveling way 11 and the first side of the traveling way 11 whereas the moving member 13 may partially cover the second side of the traveling way 11.

In example embodiments, the moving device 100 may include a plurality of absorbing members 15 and a plurality of load supporting members 17. For example, the moving device 100 may include, as illustrated in FIG. 1, two absorbing members 15 and four load supporting members 17. In this case, two load supporting members 17 may be disposed between the first side of the traveling way 11 and a first inner side of the moving member 13, and the two absorbing members 15 may be disposed between the second side of the traveling way 11 and a second inner side of the moving member 13. The two absorbing members 15 may substantially correspond to the two load supporting members 17, respectively. Additionally, two load supporting members 17 may be disposed between the upper face of the traveling way 11 and a bottom face of the moving member 13. The load supporting members 17 and the absorbing members 15 may be separated by a substantially identical interval. However, the number of the absorbing members 15 and/or the number of the load supporting members 17 may vary in accordance with the dimensions of the moving device 100, the dimensions of the apparatus for supplying chemical liquid including the moving device 100, the dimensions of the OHT utilizing the moving device 100, etc.

When the moving device 100 includes the plurality of absorbing members 15 and the plurality of load supporting members 17 which may be arranged in the above-described configuration, the moving member 13 may stably run over the traveling way 11 along the moving path provided by the traveling way 11 while the moving member 13 may be separated from the traveling way 11 by a substantially constant distance, as described below. Further, the damages to the traveling way 11 and/or the moving member 13 may be effectively prevented by the absorbing members 15 and the load supporting members 17.

If the moving member 13 is tilted toward the right or the left while the moving member 13 runs over the traveling way 11, the moving member 13 may be deviated from the moving path provided by the traveling way 11. In other words, the moving member 13 may fall off the traveling way 11 when the moving member 13 is inclined to the right or to the left over the traveling way 11. To this end, the load supporting members 17 may enable the moving member 13 to be separated from the traveling way 11 by the substantially constant distance while the moving member 13 moves over the traveling way 11. Particularly, the load supporting members 17 may support the loads applied to the moving member 13 and the traveling way 11. As such, the load supporting members 17 of the moving device 100 may support the loads applied to the moving member 13 and the traveling way 11 so that the moving member 13 may more stably run along the moving way while maintaining the substantially constant distance between the moving member 13 and the traveling way 11.

When the moving member 100 moves over the traveling way 11 along the moving path, the moving member 100 may not maintain the constant distance relative to the traveling way 11 because of various factors including, but not limited to, the variation of the loads applied to the moving member 100 and the conditions of the traveling way 11, and thus the moving member 100 may deviate from the moving path. That is, the moving member 13 may fall off the traveling way 11. Therefore, the moving member 13 and/or the traveling way 11 may be damaged by an impulsive load or an impulsive force applied to the traveling way 11 and the moving member 13 if the moving member 13 falls off the traveling way 11.

Considering the above problems, the moving device 100 may include the absorbing members 15 so as to prevent the moving member 13 from being deviated from the moving path (that is, so as to prevent the moving member 13 from being fallen off the traveling way 11) due to the various factors including the variation of the loads applied to the moving member 13 and the conditions of the traveling way 11 while the moving member 13 runs over the traveling way 11 along the moving path. In other words, the absorbing members 15 may absorb the impulsive load or the impulsive force applied to the moving member 13 and the traveling way 11 such that the damages to the moving member 13 and/or the traveling way 11 may be effectively prevented.

Hereinafter, the absorbing members 15 and the load supporting members 17 according to example embodiments of the invention will be described in detail.

As for the moving device 100 according to example embodiments, the plurality of load supporting members 17 and the plurality of absorbing members 15 may be disposed between the moving member 13 and the traveling way 11. The plurality of load supporting members 17 may maintain the constant distance between the moving member 13 and the traveling way 11. Further, when moving member 13 runs over the traveling way 11, the plurality of load supporting members 17 and the plurality of absorbing members 15 may prevent the moving member 13 from being inclined to the right and/or to the left over the traveling way 11. Accordingly, the moving member 13 may stably run over the traveling way 11 along the moving path.

The absorbing members 15 may absorb the impulsive load or the impulsive force applied to the moving member 13 and the traveling way 11 when the moving member 13 moves over the traveling way 11 and when the moving member 13 deviates from the moving path. Therefore, the absorbing members 15 may prevent the traveling way 11 and/or the moving member 13 being damaged by the impulsive load or the impulsive force.

As described above, the moving device 100 may include the plurality of load supporting members 17. For example, the moving device 100 may include the two load supporting members 17 disposed between the upper face of the traveling way 11 and the bottom face of the moving member 13, and the two load supporting members 17 positioned between the first side of the traveling way 11 and the first inner side of the moving member 13. The load supporting members 17 may be separated from each other by the substantially constant interval. Additionally, the moving device 100 may include the two absorbing members 15 disposed between the second side of the traveling way 11 and the second inner side of the moving member 13. In this case, the plurality of load supporting members 17 may not be overlapped with the plurality of absorbing members 15 between the traveling way 11 and the moving member 13. However, the number of the load supporting members 17 and the number of the absorbing members 15 may vary as occasion demands.

According to example embodiments, the plurality absorbing members 15 and/or the plurality load supporting members 17 may include air bearings, respectively. Preferably, each of the absorbing members 15 may include the air bearing. When each of the load supporting members 17 includes the air bearing, the load supporting members 17 may support the load applied to the moving member 13 and the traveling way 11 using pneumatic pressures provided by the air bearings. With these load supporting members 17, the moving member 13 may more stably runs over the traveling way 11 along the moving path while maintaining the substantially constant interval between the moving member 13 and the traveling way 11.

Figure 3:
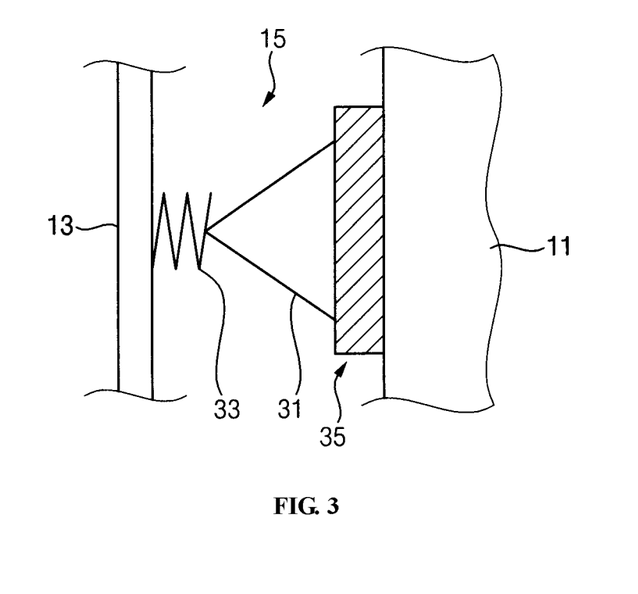
FIG. 3 is an enlarged cross sectional view illustrating an absorbing member in accordance with example embodiments of the invention.

FIG. 3 is a schematic cross sectional view illustrating the absorbing members 15 of the moving device 100 in accordance with example embodiments of the invention.

Referring to FIG. 2 and FIG. 3, each of the absorbing members 15 may include an air bearing 31 and may further include a damping member 33 which may be coupled to the air bearing 31. For example, the damping member 33 may include a spring plate connected to the air bearing 31. The air bearing 31 may provide an air gap 35 between the second side of the traveling way 11 and the air bearing 31. Therefore, the damping member 33 and the air bearing 31 may efficiently absorb impact and/or vibration relative to the moving member 13 and the traveling way 11. Each of the absorbing members 15 including the air bearing 31 and the damping member 33 may more effectively absorb the impulsive load or the impulsive force applied to the moving member 13 and the traveling way 11 when the moving member 13 falls of the traveling way 11 (that is, the moving member 13 may deviate from the moving path). As a result, the damages to the moving member 13 and/or the traveling way 11 may be effectively prevented by the absorbing members 15 including the air bearings 31 and the damping members 33. Further, the damping member 33 and the air bearing 31 may absorb the impact to the moving member 13 and the traveling way 11 and/or vibrations generated between the moving member 13 and the traveling way 11 so that the moving member 13 may more stably move over the traveling way 11. Moreover, the substantially constant distance may be maintained between the moving member 13 and the traveling way 11 by the air gaps 35 provided by the air bearings 31 of absorbing members 15.

As such, the moving device 100 according to example embodiments may include the load supporting members 17 having the air bearings and the absorbing members 15 having the air bearings 31 and the damping members 33, so that the moving device 100 may maintain the substantially constant distance between the moving member 13 and the traveling way 11 when the moving member 13 moves over the traveling way 11, and also the moving device 100 may prevent the damages to the moving member 13 and/or the traveling way 11 when the moving member 13 falls off the traveling way 11.

Referring now to FIG. 1, each of the absorbing members 15 disposed between the second side of the traveling way 11 and the second inner side of the moving member 13 may be substantially corresponded to each of the load supporting members 17 disposed between the first side of the traveling way 11 and the first inner side of the moving member 13. In other words, the plurality of absorbing members 15 and the plurality of load supporting members 17 may be separated by the substantially identical interval. Further, each of the load supporting members 17 may be preferably disposed on a reference plane of movement when the moving member 13 runs along the moving path. Here, the reference plane of movement may be a plane providing a reference moving path relative to the moving path and may be located between the traveling way 11 and the moving member 13.

As described above, the moving device 100 of example embodiments may include the load supporting members 17 positioned between the first side of the traveling way 11 and the first inner side of the moving member 13, and the load supporting members 17 located between the upper face of the traveling way 11 and the bottom face of the moving member 13. In this case, the absorbing members 15 may be disposed between the second side of the traveling way 11 and the second inner side of the moving member 13. Therefore, the load supporting members 17 and the absorbing members 15 may not be substantially overlapped between the traveling way 11 and the moving member 13.

The first side of the moving member 13 may entirely cover the first side of the traveling way 11 so that the first side of the moving member 13 may substantially fully cover the load supporting members 17. Additionally, the second side of the moving member 13 may partially cover the second side of the traveling way 11 such that the second side of the moving member 13 may substantially cover the absorbing members 15. Moreover, the moving member 13 may cover the load supporting members 17 disposed between the upper face of the traveling way 11 and the bottom face of the moving member 13.

Although not illustrated, the moving member 13 may have a space for receiving an object (for example, a substrate) which may be transferred along the traveling way 11, or may have a member such as a hook or a ring on which the object may be hung.

Figure 4:
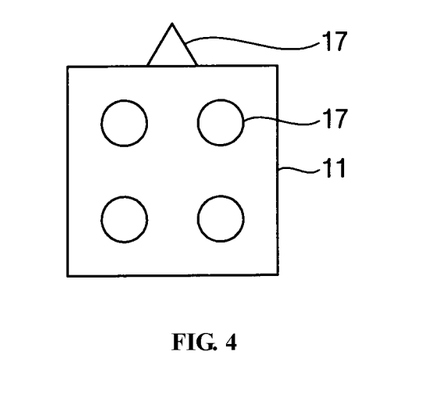
FIG. 4 and FIG. 5 illustrate the arrangements of the absorbing members 15 and the load supporting members 17 in accordance with example embodiments of the invention.
Figure 5:
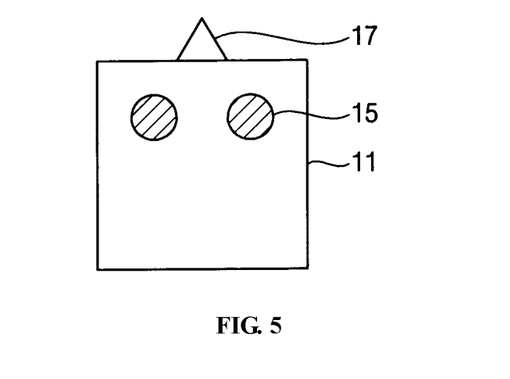

FIG. 4 and FIG. 5 illustrate the arrangements of the absorbing members 15 and the load supporting members 17 in accordance with example embodiments of the invention.

Referring FIG. 4 and FIG. 5, the absorbing members 15 may be disposed between the second side of the traveling way 11 and the second inner side of the moving member 13, and the load supporting members 17 may be positioned between the upper face of the traveling way 11 and the bottom face of the moving member 13 and between the first side of the traveling way 11 and the first inner side of the moving member 13. Further, the first side of the moving member 13 may fully cover the first side of the traveling way 11 while the second side of the moving member 13 may partially cover the second side of the traveling way 11. In example embodiments, it may vary the number of the load supporting members 17 disposed between the first side of the traveling way 11 and the first inner side of the moving member 13, and between the upper face of the traveling way 11 and the bottom face of the moving member 13. Additionally, it may vary the number of the absorbing members 15 disposed between the second side of the traveling way 11 and the second inner side of the moving member 13.

As illustrated in FIG. 4, the load supporting members 17 may be arranged in an arrangement of two columns and two rows between the first inner side of the moving member 13 and the first side of the traveling way 11. Further, the load supporting members 17 may be arranged in an arrangement of one column and two rows between the bottom face of the moving member 13 and the upper face of the traveling way 11. As illustrated in FIG. 5, the absorbing members 15 may be arranged in an arrangement of one column and two rows between the second inner side of the moving member 13 and the second side of the traveling way 11.

In some example embodiments, the absorbing members 15 may be disposed between the first inner side of the moving member 13 and the first side of the traveling way 11. In this case, the absorbing members 15 may be arranged in an arrangement of two columns and two rows between the first inner side of the moving member 13 and the first side of the traveling way 11. Additionally, the load supporting members 17 may be disposed between the second inner side of the moving member 13 and the second side of the traveling way 11. Here, the load supporting members 17 may be arranged in an arrangement of one column and two rows between the second inner side of the moving member 13 and the second side of the traveling way 11. Moreover, two the load supporting members 17 may be arranged in an arrangement of one column between the bottom face of the moving member 13 and the upper face of the traveling way 11.

As described above, the various numbers of the load supporting members 17 and the various numbers of absorbing members 15 may be arranged in various arrangements between the moving member 13 and the traveling way 11 considering various factors including the loads applied to the moving member 13 and the traveling way 11 and the conditions of the traveling way 11.

According to example embodiments, the moving device 100 may include the load supporting members 17 and the absorbing members 15 arranged in the above described arrangements so that the moving device 100 may more stably move over the traveling way 11 while maintaining the substantially constant distance between the moving member 13 and the traveling way 11. Further, if the moving member 13 may be deviated from the moving path, the impulsive load or the impulsive force applied to the moving member 13 and/or the traveling way 11 such that the damaged to the moving member 13 and the traveling way 11 may be prevented.

Referring now to FIG. 1, the traveling way 11 of the moving device 100 may generally have the shape of substantially straight line, or alternatively the traveling way 11 may include the straight portions and the curved portions. The driving member 19 may apply the driving force to the moving member 13 such that the moving member 13 may run over the traveling way 11. For example, the driving member 19 may include a motor such as a linear motor for moving the moving member 13 along the moving path. By using the driving member 19, the moving member 13 may move over the traveling way 11 along one direction as well as both directions.

As noted above, the moving member 13 may deviate from the moving path while the moving member 13 runs over the traveling way 11. Although the absorbing members 15 may absorb the impulsive load or the impulsive force applied to the moving member 13 and/or the traveling way 11, the correction of the moving member 13 and/or the traveling way 11 may be required since the moving member 13 falls off the traveling way 11. The control member 21 may adjust the driving force provided by the driving member 19 such that the moving member 13 and/or the traveling way 11 may be corrected if the moving member 13 deviates from the moving path. In example embodiments, the control member 21 and the driving member 19 may cooperatively operate so as to correct the moving member 13 and/or the traveling way 11 when the moving member 13 deviates from the moving path. Therefore, the moving device 100 including the moving member 13, the driving member 19 and the control member 21 may be stably transport the object if the object has increased dimensions.

Hereinafter, it will be described in detail an apparatus for supplying chemical liquid including a moving device and a chemical liquid supply member in accordance with example embodiments of the invention. However, it can be understood that the invention is not limited to the apparatus for supplying chemical liquid and can be employed in other apparatuses such as an OHT.

Figure 6:
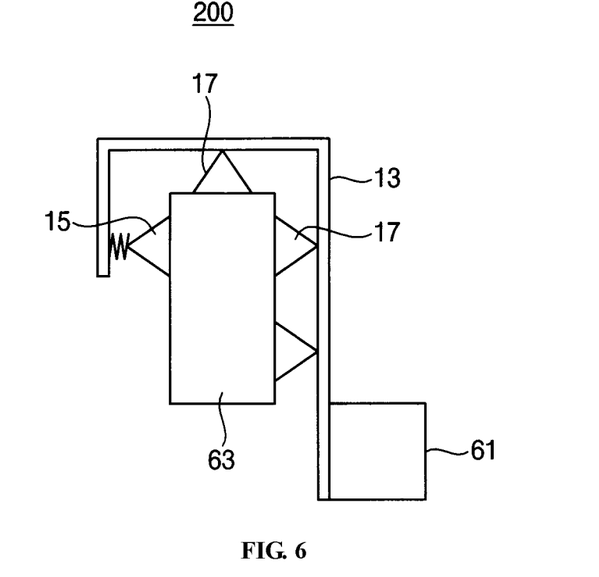
FIG. 6 is a schematic plan view illustrating an apparatus for supplying chemical liquid in accordance with example embodiments of the invention.

FIG. 6 is a schematic plan view illustrating an apparatus for supplying chemical liquid in accordance with example embodiments of the invention.

Referring to FIG. 6, an apparatus for supplying chemical liquid 200 in accordance with example embodiments may have a substantial cantilever structure. The apparatus for supplying chemical liquid 200 illustrated in FIG. 6 may include the moving device 100 described with reference to FIG. 1 to FIG. 5 as well as a chemical liquid supply member 61. For example, the chemical liquid supply member 61 may include at least one ink jet head.

The at least one ink jet head of the chemical liquid supply member 61 may include a plurality of nozzles for spraying chemical liquid onto a substrate. The plurality of nozzles may be arranged by constant intervals. Additionally, the at least one ink jet head may include a plurality of piezoelectric elements disposed adjacent to the plurality of nozzles, respectively. Here, the number of the piezoelectric elements may be substantially the same as the number of the nozzles. The chemical liquid may be provided onto the substrate by the operations of the piezoelectric elements. Particularly, the amounts of the chemical liquid sprayed onto the regions of the substrate from the nozzles may be independently adjusted by controlling voltages to the piezoelectric elements, respectively.

In example embodiments, the apparatus for supplying chemical liquid 200 may additionally include a stage on which the substrate is placed and a transferring member for transferring the substrate. The stage may be a floating stage which may float the substrate from a surface thereof. When the apparatus for supplying chemical liquid 200 includes the floating stage, the apparatus for supplying chemical liquid 200 may further includes an air supply member capable of spraying an air onto a bottom face of the substrate and a vacuum suction member capable of providing an absorption force to the bottom face of the substrate.

The transferring member may hold one side or both sides of the substrate floated over stage, and then may transfer the substrate over the floating stage. In example embodiments, the transferring member may include a guide rail, a holding member and a driving member. The guide rail may be disposed adjacent to one side of the stage. Alternatively, two guide rails may be disposed adjacent to both sides of the stage, respectively. The holding may hold one side or both sides of the substrate and may move along the guide rail. The driving member may provide a predetermined driving force to the holding member.

The chemical liquid supply member 61 of the apparatus for supplying chemical liquid 200 may be provided as a package including a plurality of ink jet heads. For example, the chemical liquid supply member 61 may be provided as one module including three ink jet heads. Alternatively, the chemical liquid supply member 61 may be provided as a plurality of modules including a plurality of ink jet heads, respectively. Thus, the chemical liquid supply member 61 may have a relatively large volume and a relatively heavy weight. To this end, the apparatus for supplying chemical liquid 200 may include the moving device 100 described with reference to FIG. 1 to FIG. 5 for the chemical liquid supply member 61 having relatively large dimensions.

As illustrated in FIG. 6, the apparatus for supplying chemical liquid 200 may include a moving member 13 capable of supporting one side of the chemical liquid supply member 61 and a gantry 63 capable of providing a moving path for the moving member 13.

The gantry 63 may be disposed in a direction substantially perpendicular to a direction where the substrate is transferred over the stage. For example, the substrate may be transferred along a first direction and the gantry 63 may be arranged in a second direction substantially perpendicular to the first direction. Thus, the moving member 13 may run along the gantry 63 in the second direction while transferring the substrate in the first direction. The chemical liquid may be provided onto the substrate from the chemical liquid supply member 61 supported by such moving member 13.

Since the apparatus for supplying chemical liquid 200 may include the load supporting members 17 and the absorbing members 15 described with reference to FIG. 1 to FIG. 5, the moving member 13 may stably move over the gantry 63 while maintaining a substantially constant distance between the moving member 13 and the gantry 63. If the moving member 13 may deviate from a moving path provided by the gantry 63, the absorbing members 15 may absorb an impulsive load or an impulsive force applied to the moving member 13 and/or the gantry 63 so that the damages to the moving member 13 and the gantry 63 may be prevented. In this case, the load supporting members 17 may be disposed between a first side of the gantry 63 and a first inner side of the moving member 13 and between an upper face of the gantry 63 and the bottom face of the moving member 13. Additionally, the absorbing members 15 may be disposed between a second side of the gantry 63 and a second inner side of the moving member 13.

In example embodiments, when the moving member 13 supporting the chemical liquid supply member 61 having the increased dimensions over the gantry 63, the moving member 13 may stably run over the gantry 63 by the load supporting members 17 even if a considerably increased load applied to the moving member 13 and the gantry 63 from the chemical liquid supply member 61. Further, a considerably increased impulsive load or a considerably increased impulsive force applied to the moving member 13 and/or the gantry 63 may be effectively absorbed by the absorbing members 15 if the moving member 13 supporting the chemical liquid supply member 61 falls off the gantry 63. Therefore, the chemical liquid may be exactly discharged onto desired regions of the substrate from the chemical liquid supply member 61 moved with the moving member 13.

In addition, the apparatus for supplying chemical liquid 200 may include the driving member 19 and the control member 21 illustrated in FIG. 1 such that driving member 19 and the control member 21 may correct the moving member 13 and/or the gantry 63 if the moving member 13 deviates from the moving path provided by the gantry 63.

According to example embodiments, the load supporting members 17 may enable the moving member 13 supporting the chemical liquid supply member 61 to stably run along the moving path while the substantially constant distance between the gantry 63 and the moving member 13 is maintained. Further, the absorbing members 15 may effectively absorb the impulsive load or the impulsive force applied to the moving member 13 and/or the gantry 63 if the moving member 13 falls of the gantry 63 so that the damages to the moving member 13 and the gantry 63 may be efficiently prevented. Moreover, the control member 21 and the driving member 19 may correct the moving member 13 and/or the gantry 63 if the moving member 13 deviates from the moving path. Therefore, the chemical liquid may be stably supplied onto the substrate from the chemical liquid supply member 61 while ensuring the stable movement of the moving member 13 and effectively preventing the damages to the moving member 13 and the gantry 63.

Figure 7:
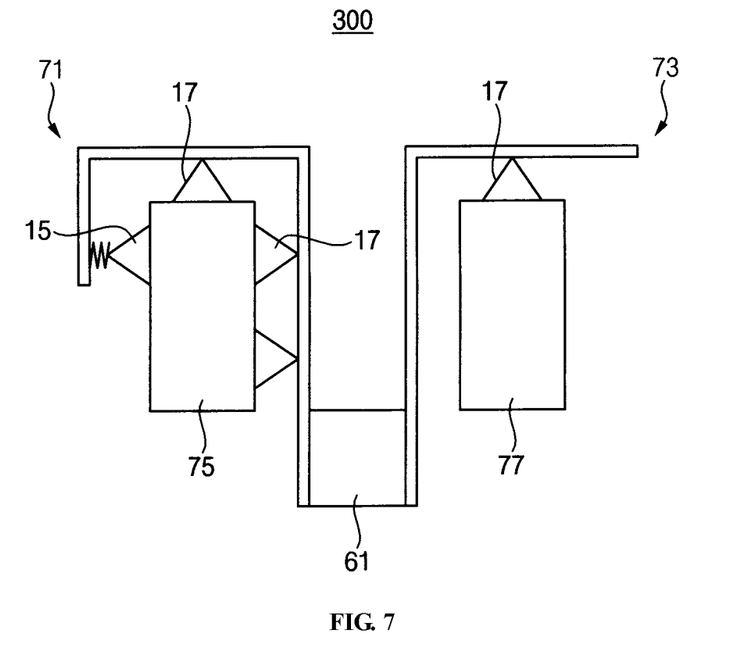
FIG. 7 is a schematic plan view illustrating an apparatus for supplying chemical liquid in accordance with some example embodiments of the invention.
Figure 8:
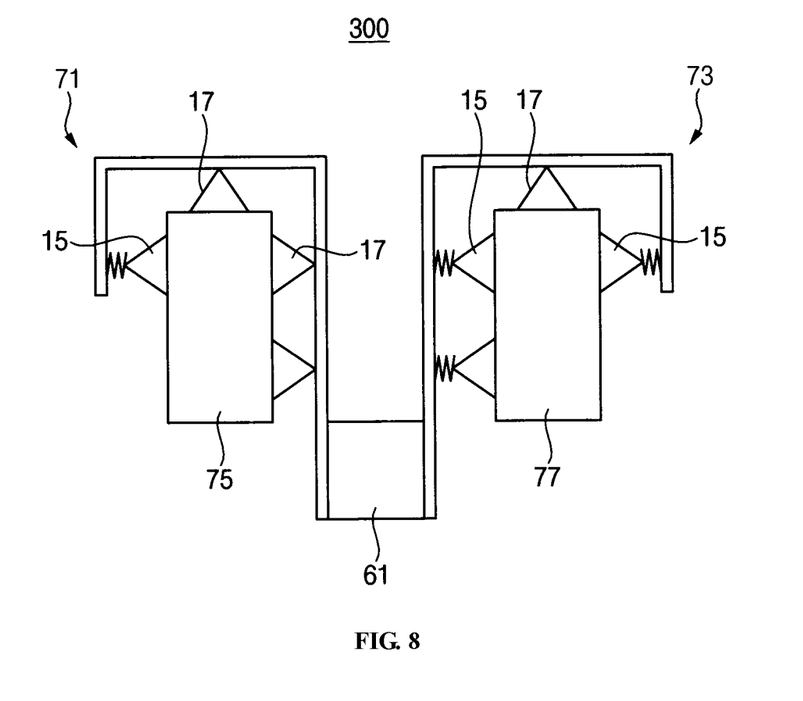
FIG. 8 is a schematic plan view illustrating an apparatus for supplying chemical liquid in accordance with other example embodiments of the invention.
Figure 9:
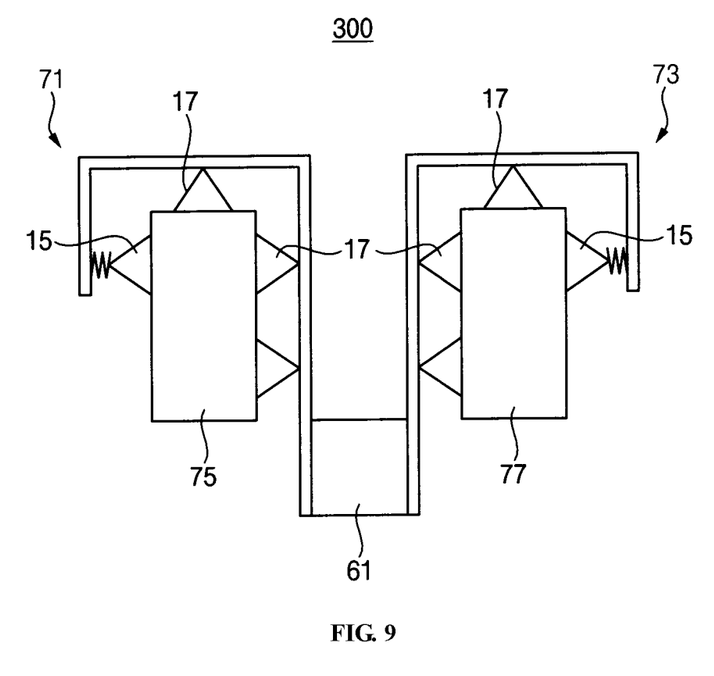
FIG. 9 is a schematic plan view illustrating an apparatus for supplying chemical liquid in accordance with still other example embodiments of the invention.

FIG. 7 is a schematic plan view illustrating an apparatus for supplying chemical liquid in accordance with some example embodiments of the invention. FIG. 8 is a schematic plan view illustrating an apparatus for supplying chemical liquid in accordance with other example embodiments of the invention. FIG. 9 is a schematic plan view illustrating an apparatus for supplying chemical liquid in accordance with still other example embodiments of the invention.

Each of the apparatuses for supplying chemical liquid illustrated in FIG. 7 to FIG. 9 may have a dual structure including a first moving device and a second moving device. Here, each of the first moving device and the second moving device may be substantially the same as the moving device 100 described with reference to FIG. 1 to FIG. 5. In FIG. 7 to FIG. 9, each of apparatuses for supplying chemical 300 may have the configuration substantially the same as that of the apparatuses for supplying chemical 200 described with reference to FIG. 6 except a first gantry 75, a second gantry 77, a first moving member 71 and a second moving member 73. More particularly, each of the apparatuses for supplying chemical liquid illustrated in FIG. 7 to FIG. 9 may include the chemical liquid supply member 61, the stage and the transferring member described with reference to FIG. 6 in addition to the first moving device and the second moving device.

Referring to FIG. 7, the apparatus for supplying chemical liquid 300 may include the first gantry 75, the second gantry substantially facing the first gantry 75 and the chemical liquid supply member 61 for providing chemical liquid onto a substrate.

The first moving member 71 of the first moving device may support one side of the chemical liquid supply member 61 and the second moving member 73 of the first moving device may support another side of the chemical liquid supply member 61. The first moving member 71 may run over the first gantry 71 and the second moving member 73 may run over the second gantry 77. That is, the first moving member 71 may move along a first moving path provided by the first gantry 71 and the second moving member 73 may move along a second moving path provided by the second gantry 77.

The first moving device may include the absorbing members 15 and the load supporting members 17 whereas the second moving device may include the load supporting members 17. Alternatively, the second moving device may additionally include the absorbing members 15. The absorbing members 15 of the first and second moving devices may absorb impulsive loads or the impulsive forces applied to the first moving member 71 and/or the first gantry 75 and the second moving member 73 and/or the second gantry 77 if the first moving member 71 may deviate from the first moving path and/or the second moving member 73 may deviate from the second moving path. The load supporting members 17 of the first and second moving devices may support loads applied to the first moving member 71 and the second moving member 73 such that the first moving member 71 and the second moving member 73 may stably move over the first gantry 75 and the second gantry 77, respectively while maintaining a substantially constant distance between the first moving member 71 and the first gantry 75 and maintaining a substantially constant distance between the second moving member 73 and the second gantry 75.

In some example embodiments, the load supporting members 17 of the first moving device may be disposed between a first side of the first gantry 75 and a first inner side of the first moving member 71 and between an upper face of the first gantry 75 and a bottom face of the first moving member 71. The absorbing members 15 of the first moving device may be disposed between a second side of the first gantry 75 and a second inner side of the first moving member 71. The load supporting members 17 of the second moving device may be disposed between a first side of the second gantry 77 and a first inner side of the second moving member 73 and between an upper face of the second gantry 77 and a bottom face of the second moving member 73. The absorbing members 15 of the second moving device may be disposed between a second side of the second gantry 77 and a second inner side of the second moving member 73. In other words, the load supporting members 17 and the absorbing members 15 of the first and second moving devices may be disposed among the first gantry 75, the first moving member 71, the second gantry 77 and the second moving member 73 such that the load supporting members 17 and the absorbing members 15 may not be overlapped, respectively.

In each of the apparatuses for supplying chemical liquid 300 illustrated in FIG. 7 to FIG. 9, the first moving member 71 and the second moving member 73 may independently operate, and thus an positional error may be generated between one side and another side of the chemical liquid supply member 61 supported by the first moving member 71 and the second moving member 73. As a result, the first moving member 71 may deviate from the first moving way or the second moving member 73 may deviate from the second moving path. To this end, each of the apparatuses for supplying chemical liquid 300 may include the load supporting members 17 so that the first moving member 71 may more stably run over the first gantry 75 and the second moving member 73 may more stably run over the second gantry 75 while maintaining the substantially constant distance between the first moving member 71 and the first gantry 75 and maintaining the substantially constant distance between the second moving member 73 and the second gantry 77. Further, each of the apparatuses for supplying chemical liquid 300 may include the absorbing members 15 such that the absorbing members 15 may efficiently absorb the impulsive load or the impulsive force applied to the first moving member 71 and/or the first gantry 75 and the impulsive load or the impulsive force applied to the second moving member 73 and/or the second gantry 77 if the first moving member 71 may fall off the first gantry 75 or the second moving member 73 may fall off the second gantry 77. Therefore, the damages to the first moving member 71, the first gantry 75, the second moving member 73 and the second gantry 77 may be effectively prevented.

In each of the apparatuses for supplying chemical liquid 300 illustrated in FIG. 7 to FIG. 9, the first moving device may additionally include a first driving member and a first control member and the second moving device may additionally include a second driving member and a second control member. The first driving member may provide a first driving force to the first moving member 71 so that the first moving member 71 may run over the first gantry 75. The second driving member may provide a second driving force to the second moving member 33 such that the second moving member 73 may run over the second gantry 77. The first control member may correct the first moving member 71 by adjusting the first driving force of the first driving member. The second control member may correct the second moving member 73 by adjusting the second driving force of the second driving member. In other words, the first and second control members may cooperate with the first and second driving members to correct the first and second moving members 71 and 73, respectively. The first and second driving members and the first and second control members may be substantially the same as the driving member 19 and the control member 21 described with reference to FIG. 1.

In some example embodiments, the load supporting members 17 may maintain the substantially constant distances between the first moving member 71 and the first gantry 75 and between the second moving member 73 and the second gantry 75 such that the load supporting members 17 may enable the first and second moving members 71 and 73 to stably run over the first and second gantries 75 and 77, respectively. In addition, the absorbing members 15 may absorb the impulsive loads or the impulsive forces applied to the first moving member 71 and/or the first gantry 75 and the second moving member 73 and/or the second gantry 77 when the first and second moving members 71 and 73 may deviate from the first and second moving paths, and thus the absorbing members 15 may effectively prevent the first and second moving members 71 and 73 and the first and the second gantries 75 and 77 from being damaged. In this case, the first and second driving members and the first and second control members may correct the first moving member 71 and/or the first gantry 75 and the second moving member 73 and/or the second gantry 77.

In other example embodiments, each of the first moving member 71 and the second moving member may include a member such as a ring or a hook for easily moving the chemical liquid supply member 61 along the first and second gantries 75 and 77.

Referring now to FIG. 7, the apparatus for supplying chemical liquid 300 of the dual structure may include the load supporting members 17, the absorbing members 15, the chemical liquid supply member 61, the first moving member 71, the second moving member 73, the first gantry 75 and the second gantry 77.

The load supporting members 17 of the first and second moving devices may be disposed between one side of the first gantry 75 and one side of the first moving member 71, between an upper face of the first gantry 75 and a bottom face of the first moving member 71, between one side of the second gantry 77 and one side of the second moving member 73, and between an upper face of the second gantry 77 and a bottom face of the second moving member 73. Further, the absorbing members 15 of the first and second moving devices may be disposed between another side of the first gantry 75 and another side of the first moving member 71 and between another side of the second gantry 77 and another side of the second moving member 73. Here, the absorbing members 15 and the load supporting members 17 may be arranged such that they are not be overlapped.

In some example embodiments, the load supporting members 17 may not be disposed between one side of the second moving member 73 and one side of the second gantry 77. If any members are not interposed between one side of the second moving member 73 and one side of the second gantry 77, the second moving member 73 may ensure an improved degree of freedom of movement so that the second moving member 73 may stably move the chemical liquid supply member 61. Similarly, the absorbing members 15 may not be disposed between another side of the second moving member 73 and another side of the second gantry 77, and thus the second moving member 73 may ensure a more improved degree of freedom of movement. As a result, the chemical liquid supply member 61 may be more stably moved by the first moving member 71 and the second moving member 73 such that the chemical liquid may be exactly provided onto desired regions of the substrate from such a chemical liquid supply member 61. In this case, one side of the second moving member 73 may fully cover one side of the second gantry 77 while another side of the second moving member 73 may partially cover another side of the second gantry 77.

In the apparatus for supplying chemical liquid 300 illustrated in FIG. 7, the first and second moving members 71 and 73 may stably move over the first and the second gantries 75 and 77, and also the damages to the first and second moving members 71 and 73 and the first and the second gantries 75 and 77 may be prevented by the absorbing members 15 and the load supporting members 17 of the first and second moving devices. Further, by the first and second driving members and the first and second control members of the first and second moving devices, the first and second moving members 71 and 73 may move along the first and second moving paths, and also the corrections of the first and second moving members 71 and 73 and/or the first and the second gantries 75 and 77 may be performed.

Referring now to FIG. 8, the apparatus for supplying chemical liquid 300 of the dual structure may include the absorbing members 15, the load supporting members 17, the chemical liquid supply member 61, the first moving member 71, the second moving member 73, the first gantry 75 and the second gantry 77.

In other example embodiments, the load supporting members 17 may be disposed between an upper face of the first gantry 75 and a bottom face of the first moving member 71, between an upper face of the second gantry 77 and a bottom face of the second moving member 73, and between one side of the first gantry 75 and one side of the first moving member 71. In this case, the absorbing members 15 may be disposed between another side of the first gantry 75 and another side of the first moving member 71, between one side of the second gantry 77 and one side of the second moving member 73, and between another side of the second gantry 77 and another side of the second moving member 73.

In the apparatus for supplying chemical liquid 300 of the dual structure illustrated in FIG. 8, the load supporting members 17 may be adjacent to the upper face of the first gantry 75, the upper face of the second gantry 77 and one side of the first gantry 75. Additionally, the absorbing members 15 may be adjacent to another side of the first gantry 75, one side of the second gantry 77 and another side of the second gantry 77. If the absorbing members 15 exist between one side of the first gantry 75 and one side of the first moving member 71, the stability of movement of the first moving member 71 and/or the second moving member 73 may be reduced due to the damping provided by the absorbing members 15.

In some example embodiments, the absorbing members 15 and the load supporting members 17 may enable the first and second moving members 71 and 73 to stably run over the first and the second gantries 75 and 77, and also may prevent the damages to the first and second moving members 71 and 73 and the first and the second gantries 75 and 77. Additionally, the first and second driving members and the first and second control members may enable the first and second moving members 71 and 73 to move along the first and second moving paths, and also may perform the corrections of the first and second moving members 71 and 73 and/or the first and the second gantries 75 and 77.

Referring now to FIG. 9, the apparatus for supplying chemical liquid 300 of the dual structure may include the absorbing members 15, the load supporting members 17, the chemical liquid supply member 61, the first moving member 71, the second moving member 73, the first gantry 75 and the second gantry 77.

In other example embodiments, the load supporting members 17 may be disposed between an upper face of the first gantry 75 and a bottom face of the first moving member 71, between an upper face of the second gantry 77 and a bottom face of the second moving member 73, between one side of the first gantry 75 and one side of the first moving member 71, and between one side of the second gantry 77 and one side of the second moving member 73. In this case, the absorbing members 15 may be disposed between another side of the first gantry 75 and another side of the first moving member 71, and between another side of the second gantry 77 and another side of the second moving member 73.

In other example embodiments, the absorbing members 15 and the load supporting members 17 may enable the first and second moving members 71 and 73 to stably move over the first and the second gantries 75 and 77, and may prevent the damages to the first and second moving members 71 and 73 and the first and the second gantries 75 and 77. Further, the first and second driving members and the first and second control members may enable the first and second moving members 71 and 73 to run along the first and second moving paths, and also may perform the corrections of the first and second moving members 71 and 73 and/or the first and the second gantries 75 and 77.

As for the apparatuses for supplying chemical liquid 300 illustrated in FIG. 7 to FIG. 9, the arrangement of the absorbing members 15 and/or the arrangement of the load supporting members 17 may be suitably adjusted as occasions demand considering the chemical liquid supply member 61, the first and second moving members 71 and 73, and the first and second gantries 75 and 77.

According to example embodiments of the invention, the apparatus for supplying chemical liquid including the moving device may easily move a substrate having relatively large dimensions and may exactly provide the chemical liquid onto the desired regions of the substrate from the chemical liquid supply member.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:
1. An apparatus for supplying chemical liquid comprising:
a first gantry;
a second gantry;

a chemical liquid supply member for providing a chemical liquid onto a substrate;
a first moving member that is arranged to support one side of the chemical liquid supply member, the first moving member being disposed over the first gantry and arranged to move along the first gantry;
a second moving member that is arranged to support another side of the chemical liquid supply member, the second moving member being disposed over the second gantry and arranged to move along the second gantry;
load supporting members arranged to support loads applied to the first and the second moving members while maintaining constant distances between the first moving member and the first gantry and between the second moving member and the second gantry; and
absorbing members arranged to absorb impulsive loads or impulsive forces applied to the first and second moving members and/or the first and second gantries when the first moving member and the second moving member deviate from a first moving path and a second moving path provided by the first gantry and the second gantry, respectively.

2. The apparatus of claim 1, wherein each of the absorbing members comprises an air bearing and a damping member, and each of the load supporting members comprises an air bearing.

3. The apparatus of claim 2, wherein the damping member includes a spring plate.

4. The apparatus of claim 1, wherein
the load supporting members include a first load supporting member that is disposed between a first sidewall of the first gantry and a first sidewall of the first moving member, a second load supporting member that is disposed between a top wall of the first gantry and a wall of the first moving member, a third load supporting member that is disposed between a first sidewall of the second gantry and a first sidewall of the first moving member, and a fourth load supporting member that is disposed between a top wall of the second gantry and a wall of the of the second moving member, and
the absorbing members include a first absorbing member that is disposed between a second sidewall of the first gantry and a second sidewall of the first moving member and a second absorbing a member that is disposed between a second sidewall of the second gantry and a second sidewall of the second moving member.

5. The apparatus of claim 4, wherein:
the first sidewall of the first gantry is opposite to the second sidewall of the first gantry;
the top wall of the first gantry is coupled to a top edge of the first sidewall of the first gantry and a top edge of the second sidewall of the first gantry;
the first sidewall of the second gantry is opposite to the second sidewall of the second gantry; and
the top wall of the second gantry is coupled to a top edge of the first sidewall of the second gantry and a top edge of the second sidewall of the second gantry.

6. The apparatus of claim 1, wherein:
the load supporting members include a first load supporting member that is disposed between a top wall of the first gantry and a top wall of the first moving member, a second load supporting member that is disposed between a top wall of the second gantry and a wall of the second moving member, and a third load supporting member that is disposed between a first sidewall of the first gantry and a first sidewall of the first moving member, and
the absorbing members include a first absorbing member that is disposed between a second sidewall of the first gantry and a second sidewall of the first moving member, a second absorbing member that is disposes between a first sidewall of the second gantry and a first sidewall of the second moving member, and a third absorbing member that is disposed between a second sidewall of the second gantry and a second sidewall of the second moving member.

7. The apparatus of claim 6, wherein:
the first sidewall of the first gantry is opposite to the second sidewall of the first gantry;
the top wall of the first gantry is coupled to a top edge of the first sidewall of the first gantry and a top edge of the second sidewall of the first gantry;
the first sidewall of the second gantry is opposite to the second sidewall of the second gantry; and
the top wall of the second gantry is coupled to a top edge of the first sidewall of the second gantry and a top edge of the second sidewall of the second gantry.

8. The apparatus of claim 1, wherein
the load supporting members include a first load supporting member that is disposed between a top wall of the first gantry and a top wall of the first moving member, a second load supporting member that is disposed between a top wall of the second gantry and wall of the second moving member, and a third load supporting member that is disposed between a first sidewall of the first gantry and a first sidewall of the first moving member, and
the absorbing members include a first absorbing member that is disposed between a second sidewall of the first gantry and a second sidewall of the first moving member.

9. The apparatus of claim 8, wherein:
the first sidewall of the first gantry is opposite to the second sidewall of the first gantry;
the top wall of the first gantry is coupled to a top edge of the first sidewall of the first gantry and a top edge of the second sidewall of the first gantry.

10. The apparatus of claim 1, wherein:
a first sidewall of the first moving member entirely covers a first sidewall of the first gantry,
a second sidewall of the first moving member partially covers a second sidewall of the first gantry,
a first sidewall of the second moving member entirely covers a first sidewall of the second gantry, and
a second sidewall of the second moving member partially covers a second sidewall of the second gantry.

11. The apparatus of claim 1, further comprising:
moving member that is arranged to actuate the first moving member so as to cause the first moving member to move along the first gantry;
a second driving member that is arranged to actuate the second moving member, so as to cause the second moving member to move along the second gantry; and
a first control member that is arranged to correct a trajectory of movement of the first moving member when the trajectory of movement of the first moving member deviates from the first gantry; and
a second control member that is arranged to correct a trajectory of movement of the second moving member when the trajectory of movement of the second moving member deviates from the second gantry.

12. The apparatus of claim 1, wherein:
the first gantry is at least in part disposed in a space defined by a first sidewall of the first moving member, a second sidewall of the first moving member, and a top wall of the first moving member; and
the second gantry is at least in part disposed in a space defined by a first sidewall of the second moving member, a second sidewall of the second moving member, and a top wall of the second moving member.

13. The apparatus of claim 1, wherein:
the first moving member is arranged to hug the first gantry on three sides; and
the second moving member is arranged to hug the second gantry on three sides.

* * * * *